3,804,836
N-PHENYL-N'-DIALKYLPHOSPHINYLALKYL-
PIPERAZINES
Edward J. Glamkowski, Warren, and Joseph T. Strup-
czewski, Piscataway, N.J., and Erhard H. Wolf, Hof-
heim, Taunus, Germany, assignors to American Hoechst
Corporation, Bridgewater, N.J.
No Drawing. Filed May 26, 1972, Ser. No. 257,353
Int. Cl. C07d 51/70
U.S. Cl. 260—268 K                                    6 Claims

ABSTRACT OF THE DISCLOSURE

N-phenyl-N'-dialkylphosphinylalkyl-piperazines are obtained by condensing N-phenyl piperazines with alkylating phosphine oxides. They have utility as antihypertensive agents.

This invention relates to novel N-phenyl-N'-dialkylphosphinylalkyl-piperazines, acid addition salts thereof, methods for making them and a method for treatment of hypertension in mammals with said compounds.

In accordance with this invention, novel compounds of the formula

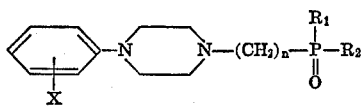

in which $R_1$ and $R_2$ are lower alkyl, X is hydrogen, halogen, lower alkyl, lower alkoxy, lower alkanoyl or trifluoromethyl and $n$ is 1, 2 or 3 are prepared by reacting N-arylpiperazines, known in the literature, with alkylating phosphine oxides according to the following reaction scheme:

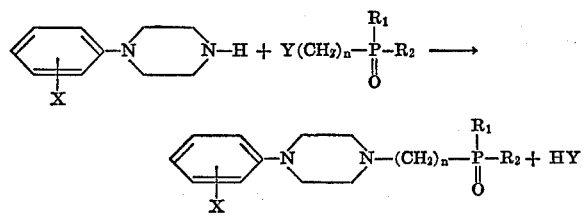

wherein $R_1$, $R_2$, X and $n$ are as defined earlier and Y is a reactive group, preferably halogen, such as chlorine, bromine or iodine, or a sulfonic acid ester group

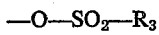

in which $R_3$ is loweralkyl, especially methyl, or aryl, especially phenyl or tolyl. The reaction is carried out in an inert solvent at a temperature of about 0 to 200° C., preferably about 80 to 120° C. for from two to 24 hours. In a preferred embodiment of the process, the reaction is carried out in the presence of an added inorganic or organic base, such as triethylamine or 2,4,6-trimethylpyridine, to bind the acid HY formed during the reaction. However, such an added base is not essential to the success of the preparation because the N-arylpiperazine can serve as the hydrogen ion acceptor. Solvents which may be used include aromatic hydrocarbons and halogenated aliphatic hydrocarbons such as benzene, toluene, prehnitene (1,2,3,4-tetramethylbenzene), tetrachloroethane; also dimethylformamide and the like, although the solvent is not critical. The compounds of the invention are isolated using conventional techniques.

Examples of the N-phenyl piperazines which may be used as starting materials are:

N-phenyl piperazine
N-(4-chlorophenyl) piperazine
N-(3-fluorophenyl) piperazine
N-(4-propionylphenyl) piperazine
N-(4-acetylphenyl) piperazine
N-(4-n-propylphenyl) piperazine
N-(4-ethoxyphenyl) piperazine Examples of phosphine oxide reactants which may be used are:

chloromethyl dimethylphosphine oxide
bromomethyl dimethylphosphine oxide
iodomethyl dimethylphosphine oxide
tosyloxymethyl dimethylphosphine oxide
2-chloroethyl dimethylphosphine oxide
3-chloropropyl dimethylphosphine oxide
chloromethyl di-n-butylphosphine oxide
mesyloxymethyl di-n-propylphosphine oxide Illustrative examples of the N'-dialkylphosphinylalkyl-N-phenyl piperazines of the invention are:

N'-dimethylphosphinylmethyl-N-phenylpiperazine
N'-dimethylphosphinylmethyl-N-(4-chlorophenyl) piperazine
N'-dimethylphosphinylmethyl-N-(4-fluorophenyl) piperazine
N'-dimethylphosphinylmethyl-N-(3-bromophenyl) piperazine
N'-dimethylphosphinylmethyl-N-(4-acetylphenyl) piperazine
N'-di-n-butylphosphinylmethyl-N-(4-propionylphenyl) piperazine
N'-dimethylphosphinylpropyl-N-(4-n-propylphenyl) piperazine
N'-dimethylphosphinylethyl-N-(3-ethoxyphenyl) piperazine
N'-dimethylphosphinylmethyl-N-(2-methoxyphenyl) piperazine
N'-dimethylphosphinylmethyl-N-($\alpha,\alpha,\alpha$-trifluoro-m-tolyl) piperazine Compounds in which $R_1$ and $R_2$ are alkyl of 1 to 4 carbon atoms, the phenyl group is unsubstituted or substituted by chlorine, bromine, fluorine, alkyl of 1 to 3 carbon atoms, alkoxy of 1 or 2 carbon atoms, alkanoyl of up to 3 carbon atoms or trifluoromethyl are generally preferred. The compounds in which $R_1$ and $R_2$ are methyl and $n$ is 1 are especially preferred because of their high solubility in water.

The novel piperazines of this invention are useful because they possess pharmacological activity. In particular, these compounds have demonstrated significant hypotensive activity when tested in the spontaneous hypertensive and the Long Evans metacorticoid rat by the indirect tail cuff method described in A. Schwartz, Ed., "Methods in Pharmacology," vol. 1, Appleton-Century Crofts, New York, N.Y., 1971, p. 135. Among the preferred compounds of this invention, N'-dimethylphosphinylmethyl-N-phenylpiperazine causes a blood pressure lowering of 22 mm. Hg at a dose of 10 mg./kg. when administered i.p. or p.o. The onset of activity appears on the second day of dosing, with a duration of activity of 24 hours. Similarly, N'-dimethylphosphinylmethyl-N-($\alpha,\alpha,\alpha$-trifluoro - m - tolyl) piperazine dihydrochloride causes a drop in blood pressure of 40 mm. Hg at 50 mg./kg., with an onset of activity within 2 hours, and the duration of the effect continuing for more than 24 hours. A decrease of 25–30 mm. Hg in blood pressure is observed at a dose of 50 mg./kg. with N'-dimethylphosphinylmethyl-N-(4-chlorophenyl) piperazine within 2 hours after administration and continuing for approximately 24 hours.

The water soluble compounds may be administered directly in an aqueous solution, or in the form of their non-toxic pharmaceutically acceptable acid addition salts. Such salts are readily prepared by reacting the base with an appropriate acid, and accordingly are included within the scope of this invention. Representative of such salts are those formed with mineral acids, such as the hydrochloride, hydrobromide, sulfate, phosphate and the like, and the organic acid salts, such as the maleate, oxalate, succinate, benzoate, p-toluenesulfonate, and the like. The N-phenyl - N - dialkylphosphinylalkyl-piperazines of the present invention have thus been found to be useful for control of hypertension in mammals when administered in amounts ranging from 1 mg. to about 200 mg. per kg. of body weight per day. The compounds of the present invention may be administered by any convenient route such as orally, intramuscularly, intravenously, subcutaneously, or interperitoneally. The preferred route of administration is oral.

The active compounds of the present invention may be orally administered, for example, with an inert diluent or with an edible carrier, or they may be enclosed in gelatin capsules, or they may be compressed into tablets. For the purpose of oral therapeutic administration, the active compounds of this invention may be incorporated with excipients and used in the form of tablets, troches, capsules, elixirs, suspensions, syrups, wafers, chewing gum, and the like. These preparations should contain at least 0.5% of active compound, but may be varied depending upon the particular form and may conveniently be between 4% to about 70% of the weight of the unit. The amount of active compound in such compositions is such that a suitable dosage will be obtained. Preferred compositions and preparations according to the present invention are prepared so that an oral dosage unit form contains between 10 and 200 milligrams of active compound.

The tablets, pills, capsules, troches, and the like may also contain the following ingredients: a binder such as microcrystalline cellulose, gum tragacanth or gelatin; an excipient such as starch or lactose, a disintegrating agent such as alginic acid, primogel, cornstarch and the like; a lubricant such as magnesium stearate or sterotex; a glidant such as magnesium stearate or sterotex; a glidant such as colloidal silicon dioxide; and a sweetening agent such as sucrose or saccharin may be added or a flavoring agent such as peppermint, methyl salicylate, or orange flavoring. When the dosage unit form is a capsule, it may contain, in addition to materials of the above type, a liquid carrier such as a fatty oil. Other dosage unit forms may contain other various materials which modify the physical form of the dosage unit, for example, as coatings. Thus, tablets or pills may be coated with sugar, shellac, or other enteric coating agents. A syrup may contain, in addition to the active compounds, sucrose as a sweetening agent, and certain preservatives, dyes and colorings, and flavors. Materials used in preparing these various compositions must be pharmaceutically pure and non-toxic in the amounts utilized.

The invention is further illustrated by the following examples. The temperatures are given in degrees centigrade.

EXAMPLE 1

N'-dimethylphosphinylmethyl-N-phenylpiperazine

A stirred mixture of N-phenylpiperazine (16.2 g., 0.10 mol), chloromethyl dimethylphosphine oxide (13.9 g., 0.11 mol), and triethylamine (11.1 g., 0.11 mol) in 300 ml. of benzene is refluxed under nitrogen for 15 hours. The mixture is then filtered while hot to remove the precipitated triethylamine hydrochloride: 11.6 g., an 84% yield, are obtained. The filtrate is concentrated to a small volume (ca. 50 ml.) when the crystalline product which separates is collected, washed with benzene, then with hexane, and dried to afford 19.9 g. (79% yield) with M.P. 147–149.5° C. Recrystallization from acetone yields pure white flakes, M.P. 149–151° C., which are very soluble in water.

EXAMPLE 2

N'-dimethylphosphinylmethyl-N-(4-acetylphenyl) piperazine

By proceeding as in Example 1 but starting from N-(4-acetylphenyl) piperazine, pure yellow crystals, M.P. 170–172° C., are obtained after recrystallization from acetonitrile. This compound is soluble in water.

EXAMPLE 3

N'-dimethylphosphinylmethyl-N-(4-chlorophenyl) piperazine

By proceeding as in Example 1 but starting from N-(4-chlorophenyl) piperazine, pure white crystals, M.P. 184–187° C., are obtained after recrystallization from absolute ethanol.

EXAMPLE 4

N'-dimethylphosphinylmethyl-N-(o-tolyl) piperazine

A stirred mixture of N-(o-tolyl) piperazine (17.6 g., 0.10 mol), chloromethyl dimethylphosphine oxide (13.9 g., 0.11 mol), and triethylamine (11.1 g., 0.11 mol) in 300 ml. of benzene is refluxed under nitrogen for 10 hours. The mixture is then filtered while hot to remove the precipitated triethylamine hydrochloride salt: 10.7 g., a 78% yield, are obtained. The solvent is removed from the filtrate in vacuo leaving an oily crystalline solid. The latter is triturated with 25 ml. of ether and filtered to give 20.4 g. (76.7% yield) of crude product. Purification is effected by recrystallization from acetone:hexane. This water-soluble compound has melting point of 114–117° C.

EXAMPLE 5

N'-dimethylphosphinylmethyl-N-(3-chlorophenyl) piperazine

By proceeding as in Example 4 but starting from N-(3-chlorophenyl) piperazine dihydrochloride and using two additional equivalents of triethylamine to liberate the starting free base, there is obtained a crude brown solid which is purified as follows: The crude product is dissolved in absolute ethanol (3 ml./g.) and this is slowly added to a cold solution of hydrogen chloride in ether. The hydrochloride salt which precipitates is recrystallized from methanol:ether, and then reversed back to the free piperazine base by dissolving it in water and adding excess 3 N sodium hydroxide. This aqueous solution is extracted several times with benzene, and the combined benzene extracts are dried over sodium sulfate and concentrated in vacuo to a white solid. Recrystallization from cyclohexane yields the pure compound, M.P. 108–110° C., which is soluble in water.

EXAMPLE 6

N'-dimethylphosphinylmethyl-N-($\alpha,\alpha,\alpha$-trifluoro-m-tolyl) piperazine dihydrochloride By proceeding as in Example 5 but starting from N-($\alpha,\alpha,\alpha$-trifluoro-m-tolyl) piperazine (24.8 g., 0.10 mol) there is obtained a crude yellow oil. A dihydrochloride salt is prepared by dissolving the oil in 100 ml. of ether and adding this to a cold solution of hydrogen chloride in 100 ml. of absolute ethanol. The white salt which precipitates is filtered, washed well with ether, and dried to give 29.0 g. (74% overall yield). Recrystallization from methanol:ether yields pure dihydrochloride salt, M.P. 217–218° C., dec.

EXAMPLE 7

N'-dimethylphosphinylmethyl-N-(4-methoxyphenyl) piperazine dihydrochloride

By proceeding as in Example 6 but starting with N-(4-methoxyphenyl) piperazine dihydrochloride and using two additional equivalents of triethylamine to liberate the starting free base, pure white crystals, M.P. 215–217° C., dec., are obtained after recrystallization from absolute ethanol.

EXAMPLE 8

N'-dimethylphosphinylmethyl-N-(2-chlorophenyl) piperazine hydrochloride

By proceeding as in Example 7 but starting from N-(2-chlorophenyl) piperazine hydrochloride hydrate and using one additional equivalent of triethylamine to liberate the starting free base, there is obtained after recrystallization from absolute ethanol the hydrochloride salt of the product, M.P. 222–223° C., dec.

EXAMPLE 9

Preparation of tablet formulation

Ingredient: Milligrams per tablet
N' - dimethylphosphinylmethyl - N - phenyl-
  piperazine _____ 100
Lactose _____ 200
Cornstarch (for mix) _____ 50
Cornstarch (for paste) _____ 50
Magnesium stearate _____ 10

The active ingredient, lactose, and cornstarch (for mix) are thoroughly blended together. The cornstarch (for paste) is suspended in water at a ratio of 10 grams of cornstarch per 80 milliliters of water and heated with stirring to form a paste. The paste is then used to granulate the blended powders. The wet granules are screened through a No. 8 sieve and dried at 35°. The dried granules are screened through a No. 16 sieve. The mixture is lubricated with magnesium stearate and compressed into tablets on a suitable tableting machine such that each tablet contains 100 milligrams of active ingredient.

EXAMPLE 10

Preparation of capsule formulation

Ingredient: Milligrams per capsule
N' - dimethylphosphinylmethyl - N - (α,α,α-
  trifluoro - m - tolyl) piperazine dihydrochlo-
  ride _____ 25
Starch _____ 165
Magnesium stearate _____ 10

The active ingredient, starch, and magnesium stearate are thoroughly blended together. The resulting mixture is used to fill hard shell capsules of a suitable size at a fill weight of 200 milligrams per capsule.

We claim:

1. A compound of the formula

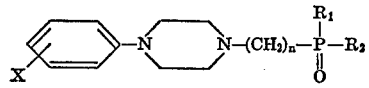

in which $R_1$ and $R_2$ are lower alkyl, X is hydrogen, halogen, lower alkyl, lower alkoxy, lower alkanoyl or trifluoromethyl and $n$ is 1, 2 or 3, and the pharmaceutically acceptable salts thereof.

2. A compound as defined in claim 1, wherein $R_1$ and $R_2$ are alkyl of 1 to 4 carbon atoms and X is hydrogen, chlorine, bromine, fluorine, alkyl of 1 to 3 carbon atoms, alkoxy of 1 or 2 carbon atoms, alkanoyl of up to 3 carbon atoms or trifluoromethyl and the pharmaceutically acceptable salts thereof.

3. A compound as defined in claim 1, wherein $R_1$ and $R_2$ are methyl, X is hydrogen, chlorine, methyl, methoxy, acetyl or trifluoromethyl and $n$ is 1, and the pharmaceutically acceptable salts thereof.

4. The compound as defined in claim 3, wherein X is hydrogen.

5. The compound as defined in claim 3, wherein X is m-trifluoromethyl.

6. The compound as defined in claim 3, wherein X is p-chlorine.

References Cited

UNITED STATES PATENTS 3,320,321   5/1967   Grayson _____ 260—268 K

OTHER REFERENCES

ITO et al.: Chem. Abstr., vol. 72, Col. 2139r (1970), abstracting German 1,917,884.

DONALD G. DAUS, Primary Examiner

U.S. C. X.R.

260—268 PH; 424—250